United States Patent
Chen et al.

(10) Patent No.: US 6,875,711 B2
(45) Date of Patent: Apr. 5, 2005

(54) FRICTION MATERIAL WITH FRICTION MODIFYING LAYER HAVING SYMMETRICAL GEOMETRIC SHAPES

(75) Inventors: Yih-Fang Chen, Lisle, IL (US); Robert C. Lam, Rochester, MI (US); Feng Dong, Rochester, MI (US); Bulent Chavdar, Rochester Hills, WI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/234,976

(22) Filed: Sep. 4, 2002

(65) Prior Publication Data

US 2004/0043243 A1 Mar. 4, 2004

(51) Int. Cl.⁷ ............................. B32B 5/16; B32B 3/26
(52) U.S. Cl. ..................... 442/72; 442/73; 442/153; 442/157; 442/161; 442/169; 442/175; 442/179; 442/417; 428/317.9; 428/311.11; 428/311.51; 428/319.1
(58) Field of Search ................. 428/317.9, 311.11, 428/311.51, 311.71, 319.1; 442/72, 73, 153, 157, 161, 169, 175, 179, 417

(56) References Cited

U.S. PATENT DOCUMENTS

| | | |
|---|---|---|
| 4,451,590 A | 5/1984 | Fujimaki et al. |
| 5,083,650 A | 1/1992 | Seiz et al. |
| 5,585,166 A | 12/1996 | Kearsey |
| 5,646,076 A * | 7/1997 | Bortz ..................... 442/136 |
| 5,707,905 A | 1/1998 | Lam et al. |
| 5,753,356 A | 5/1998 | Lam et al. |
| 5,816,901 A * | 10/1998 | Sirany ..................... 451/415 |
| 5,856,244 A | 1/1999 | Lam et al. |
| 5,858,883 A | 1/1999 | Lam et al. |
| 5,958,507 A | 9/1999 | Lam et al. |
| 5,998,307 A | 12/1999 | Lam et al. |
| 6,001,750 A | 12/1999 | Lam |
| 6,130,176 A | 10/2000 | Lam |
| 6,291,040 B1 * | 9/2001 | Moriwaki et al. ......... 428/35.2 |

FOREIGN PATENT DOCUMENTS

| | | |
|---|---|---|
| EP | 1 039 168 A1 | 9/2000 |
| EP | 1 203 897 A1 | 5/2002 |
| WO | WO 98/09093 | 3/1998 |

OTHER PUBLICATIONS

European Search Report for EP03255504 dated Dec. 12, 2003.

* cited by examiner

Primary Examiner—Terrel Morris
Assistant Examiner—Hai Vo
(74) Attorney, Agent, or Firm—Emch, Schaffer, Schaub & Porcello, Co., L.P.A.; Greg Dziegielewski

(57) ABSTRACT

A friction material has a first layer of a base material and a second layer of at least one type of friction modifying particle having substantially symmetrical geometric shapes on a top surface of the base material. The second layer has an average thickness of about 30 to about 200 microns and the surface area coverage of about 80 to about 100% such that the top layer has a fluid permeability lower than the first layer.

30 Claims, 6 Drawing Sheets

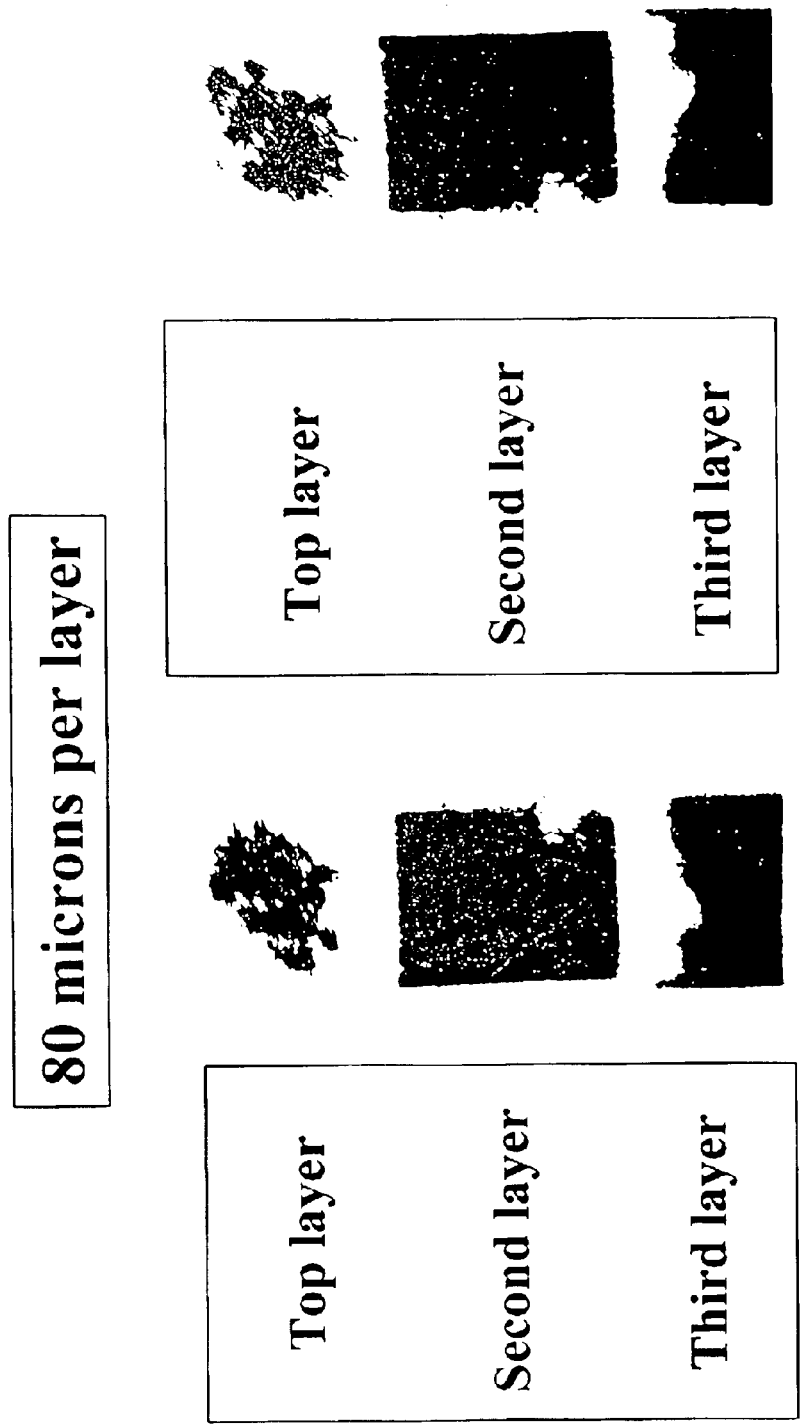
Fig. 5a - Front View
Fig. 5b - Back View

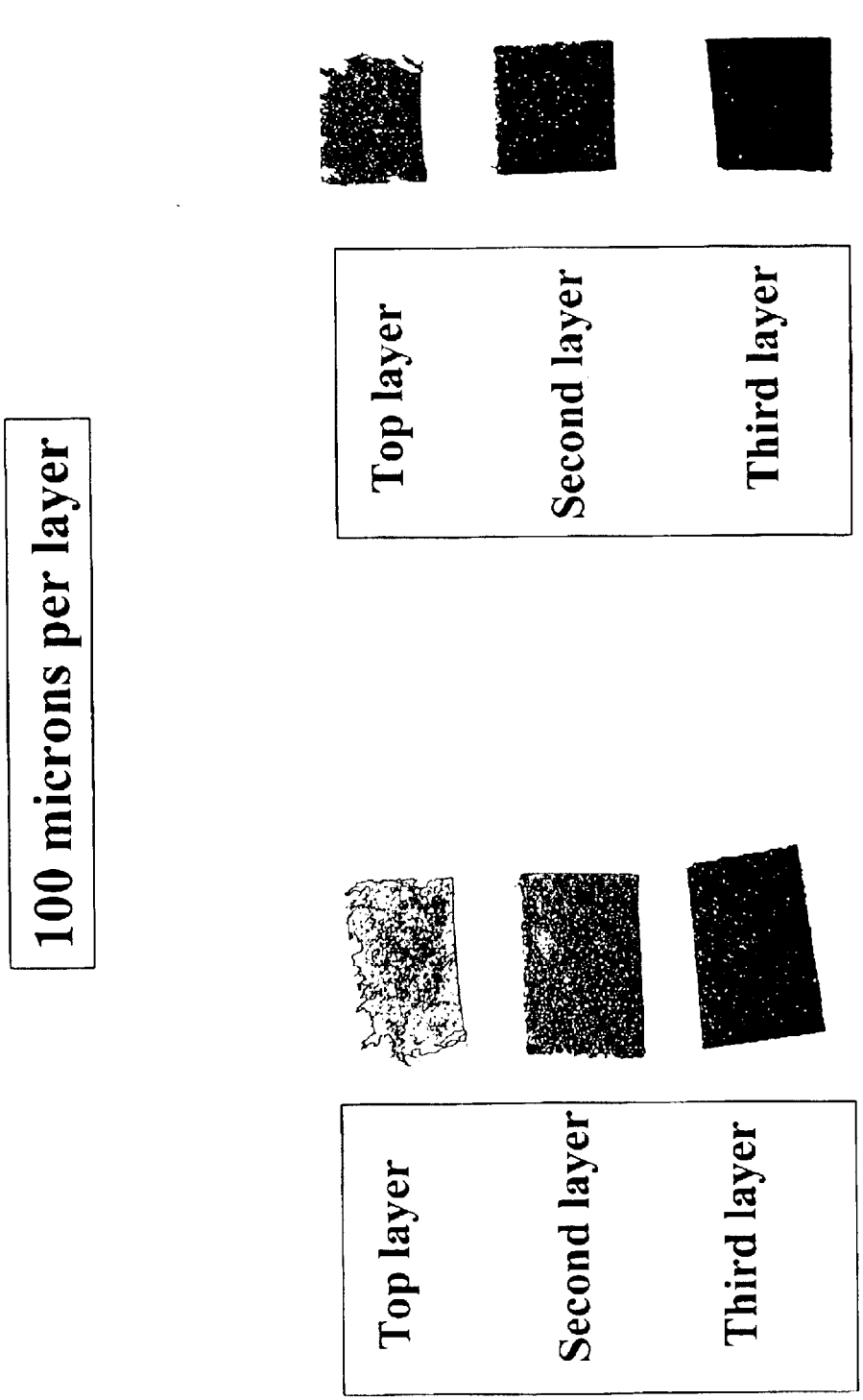

FRICTION MATERIAL WITH FRICTION MODIFYING LAYER HAVING SYMMETRICAL GEOMETRIC SHAPES

TECHNICAL FIELD

The present invention relates to a fiction material having a first or lower layer comprising a base material saturated at least one type of curable resin and a second or top layer comprising at least one type of friction modifying particles which friction modifying particles have symmetrical geometric shapes. The friction material of the present invention has high coefficient of friction characteristics and extremely high heat resistance. The friction material also has improved strength, wear resistance, and noise resistance.

BACKGROUND ART

New and advanced continuous torque transmission systems, having continuous slip torque converters and shifting clutch systems are being developed by the automotive industry. These new systems often involve high energy requirements. Therefore, the friction materials technology must be also developed to meet the increasing energy requirements of these advanced systems.

In particular, a new high performance, durable friction material is needed. The new friction material must be able to withstand high speeds wherein surface speeds are up to about 65 m/seconds. Also, the friction material must be able to withstand high facing lining pressures up to about 1500 psi. It is also important that the friction material be useful under limited lubrication conditions.

The friction material must be durable and have high heat resistance in order to be useful in the advanced systems. Not only must the friction material remain stable at high temperatures, it must also be able to rapidly dissipate the high heat that is being generated during operating conditions.

The high speeds generated during engagement and disengagement of the new systems mean that a friction material must be able to maintain a relatively constant friction throughout the engagement. It is important that the frictional engagement be relatively constant over a wide range of speeds and temperatures in order to minimize "shuddering" of materials during braking or the transmission system during power shift from one gear to another. It is also important that the friction material have a desired torque curve shape so that during frictional engagement the friction material is noise or "squawk" free.

In particular, transmission and torque-on-demand systems incorporate slipping clutches mainly for the fuel efficiency and driving comfort. The role of the slip clutch within these systems varies from vehicle launching devices, such as wet start clutches, to that of a torque converter clutches. According to the operating conditions, the slip clutch can be differentiated into three principle classes: (1) Low Pressure and High Slip Speed Clutch, such as wet start clutch; (2) High Pressure and Low Slip Speed Clutch, such as Converter Clutch; and (3) Extreme Low Pressure and Low Slip Speed Clutch, such as neutral to idle clutch.

The principal performance concerns for all applications of the slip clutch are the prevention of shudder and the energy management of the friction interface. The occurrence of shudder can be attributed to many factors including the friction characteristics of the friction material, the mating surface's hardness and roughness, oil film retention and surface oil flow, lubricant chemistry and interactions, clutch operating conditions, driveline assembly and hardware alignment, and driveline contamination. The friction interface energy management is primarily concerned with controlling interface temperature and is affected by the pump capacity, oil flow path and control strategy. The friction material surface design also contributes to the efficiency of interface energy management.

Previously, asbestos fibers were included in the friction material for temperature stability. Due to health and environmental problems, asbestos is no longer being used. More recent friction materials have attempted to overcome the absence of the asbestos in the friction material by modifying impregnating paper or fiber materials with phenolic or phenolic-modified resins. These friction materials, however, do not rapidly dissipate the high heat generated, and do not have the necessary heat resistance and satisfactory high coefficient of friction performance now needed for use in the high speed systems currently being developed.

The Kearsey U.S. Pat. No. 5,585,166 describes a multi layer friction lining having a porous substrate layer (cellulose and synthetic fibers, filler and thermoset resin) and a porous friction layer (nonwoven synthetic fibers in a thermoset resin) where the friction layer has a higher porosity than the substrate layer.

The Seiz U.S. Pat. No. 5,083,650 reference involves a multi-step impregnating and curing process; i.e., a paper impregnated with a coating composition, carbon particles are placed on the paper, the coating composition in the paper is partially cured, a second coating composition is applied to the partially cured paper, and finally, both coating compositions are cured.

Various paper based fibrous materials have been developed that are co-owned by the assignee herein, BorgWarner Inc., for use in friction materials. These references are fully incorporated herein by reference.

In particular, Lam et al., U.S. Pat. No. 5,998,307 relates to a friction material having a primary fibrous base material impregnated with a curable resin where the porous primary layer comprises at least one fibrous material and a secondary layer comprises carbon particles covering at least about 3 to about 90% of the surface of the primary layer.

The Lam et al., U.S. Pat. No. 5,858,883 relates to a base material having a primary layer of less fibrillated aramid fibers, synthetic graphite, and at least one type of filler, and a secondary layer comprising carbon particles on the surface of the primary layer.

The Lam et al., U.S. Pat. No. 5,856,224 relates to a friction material comprising a base impregnated with a curable resin. The primary layer comprises less fibrillated aramid fibers, synthetic graphite and filler; the secondary layer comprises carbon particles and a retention aid.

The Lam et al. U.S. Pat. No. 5,958,507 relates to a process for producing a friction material where about 3 to about 90% of at least one surface of the fibrous material which comprises less fibrillated aramid fibers is coated with carbon particles.

The Lam, U.S. Pat. No. 6,001,750 relates to a friction material comprising a fibrous base material impregnated with a curable resin. The porous primarily layer comprises less fibrillated aramid fibers, carbon particles, carbon fibers, filler material, phenolic novoloid fibers, and optionally, cotton fibers. The secondary layer comprises carbon particles which cover the surface at about 3 to about 90% of the surface.

Yet another commonly owned patent application Ser. No. 09/707,274 relates to a paper type friction material having a porous primary fibrous base layer with friction modifying particles covering about 3 to about 90% of the surface area of the primary layer.

In addition, various paper type fibrous base materials are described in commonly owned BorgWarner Inc. Lam et al., U.S. Pat. Nos. 5,753,356 and 5,707,905 which describe base materials comprising less fibrillated aramid fibers, synthetic graphite and filler, which references are also fully incorporated herein by reference.

Another commonly owned patent, the Lam, U.S. Pat. No. 6,130,176, relates to non-metallic paper type fibrous base materials comprising less fibrillated aramid fibers, carbon fibers, carbon particles and filler.

For all types of friction materials, in order to be useful in "wet" applications, the friction material must have a wide variety of acceptable characteristics. The friction material must have good anti-shudder characteristics; have high heat resistance and be able to dissipate heat quickly; and, have long lasting, stable and consistent frictional performance. If any of these characteristics are not met, optimum performance of the friction material is not achieved.

It is also important that a suitable impregnating resin be used in the friction material in order to form a high-energy application friction material. The friction material must have good shear strength during use when the friction material is infused with brake fluid or transmission oil during use.

Accordingly, it is an object of the present invention to provide an improved friction material with reliable and improved properties compared to those of the prior art.

A further object of this invention is to provide friction materials with improved "anti-shudder", "hot spot" resistance, high heat resistance, high friction stability and durability, and strength.

IN THE DRAWINGS

Figure 3:
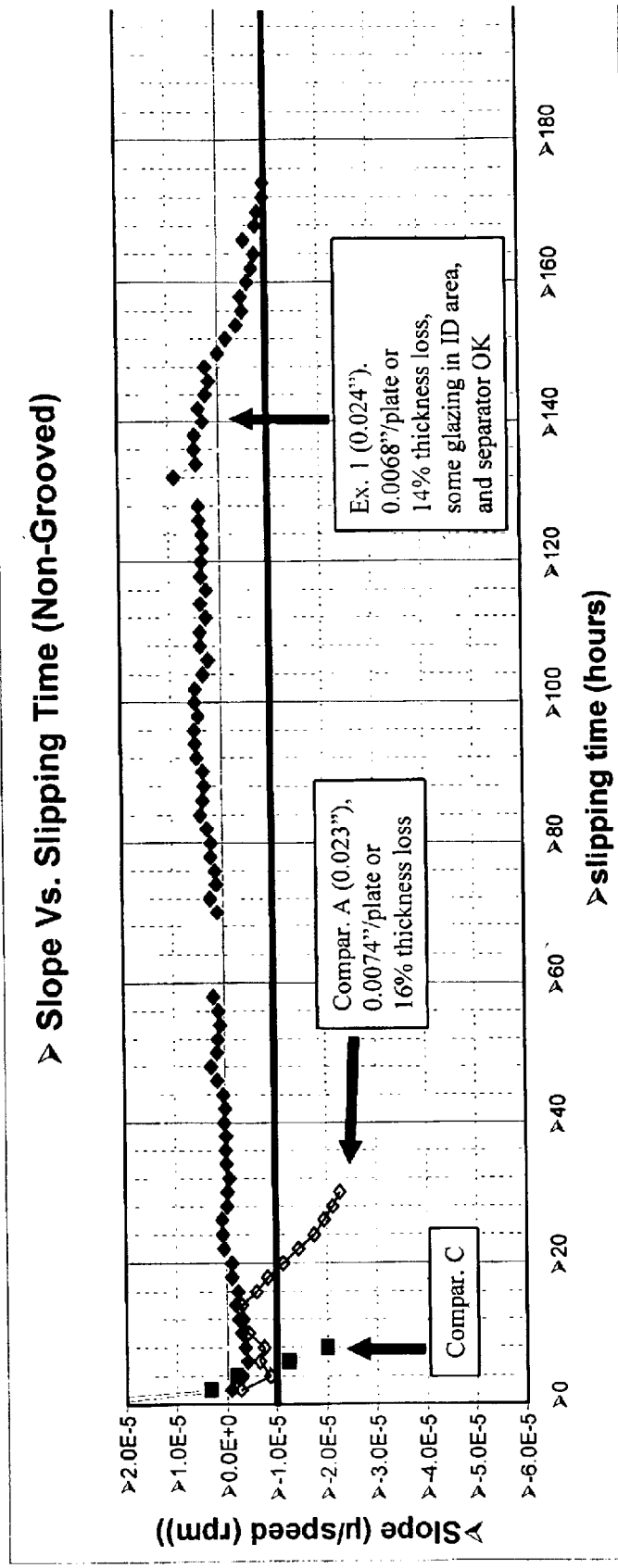

FIG. 3 is a graph that shows the $\mu$-v slope versus slipping time for Compar. A and Compar. C.

Figure 4A:
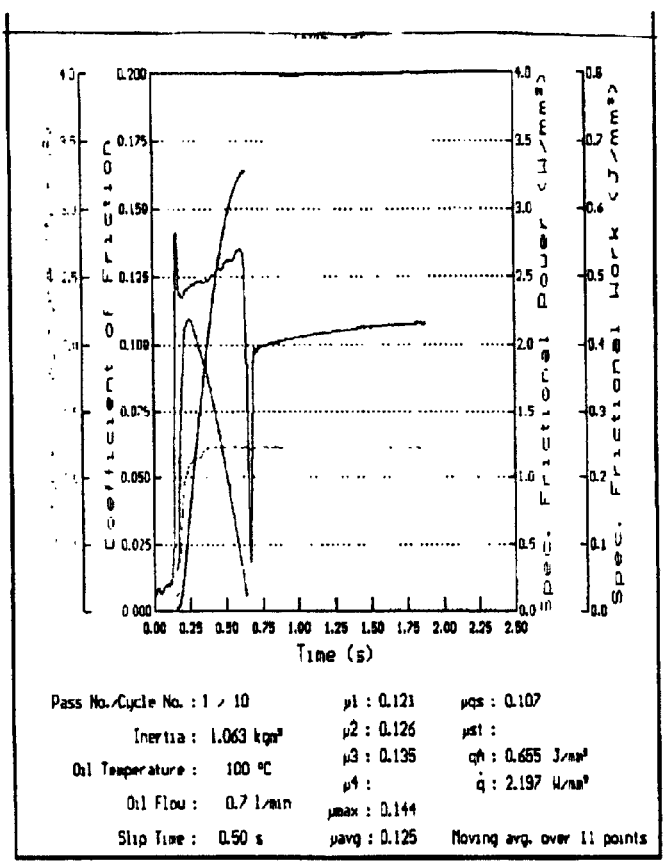
Figure 4B:
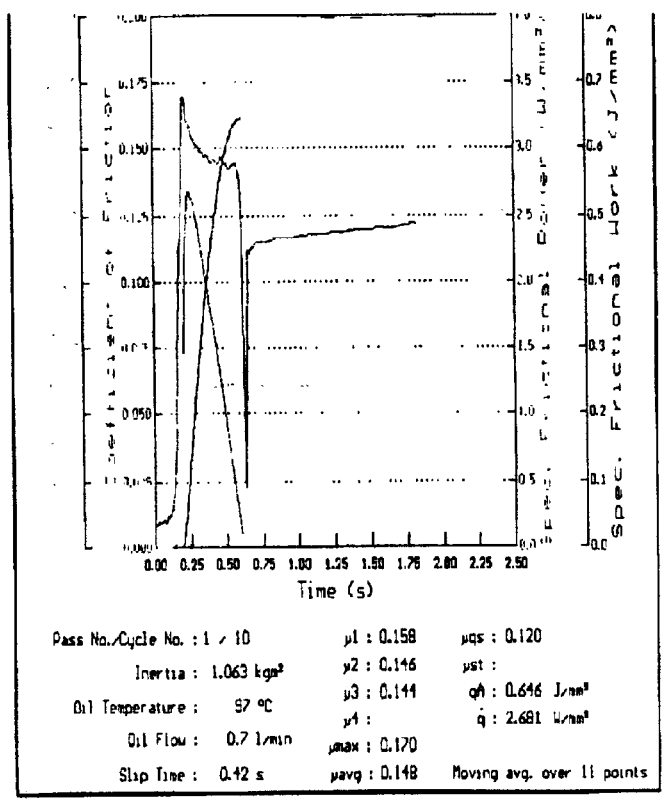

FIG. 4a is a graph that shows the low oil flows data, for Compar. A; FIG. 4b is a graph that shows the low oil flow data for the Ex. 1 as having very good anti-shudder characteristics.

FIGS. 5a and 5b are optical views of a sliced sample of the Ex. 1 material at 80 microns per layer; FIG. 5a shows the front view, and FIG. 5b shows the back view.

FIGS. 6a and 6b are optical views of a sliced sample of the Ex. 1 material at 100 microns per layer; FIG. 6a shows the front view, and FIG. 6b shows the back view.

SUMMARY OF THE INVENTION

The present invention relates to a friction material having a first layer comprising a base material and at least one type of resin material, and a second layer comprising at least one type of friction modifying particle on a top surface of the base material. The friction modifying particles have at least one type of substantially symmetrical geometric shape. In certain embodiments, the second layer has an average thickness of about 30 to about 200 microns, such that the top layer has a fluid permeability lower than the first layer. In certain preferred embodiments, the friction modifying particles have a generally flat or disc shape.

DETAILED DESCRIPTION OF INVENTION

In order to achieve the requirements discussed above, many friction materials were evaluated for friction and heat resistant characteristics under conditions similar to those encountered during operation. Commercially available friction materials were investigated and proved not to be suitable for use in high energy applications.

According to the present invention, a friction material has a uniform dispersion of the curable resin throughout a base material and a substantially uniform layer of friction modifying materials on a top or outer surface of the base material.

The top, or second, layer of the regular geometrical shaped friction modifying particles is deposited on a first, or top, surface of the base material. The presence of the friction modifying materials as a top layer on the base material provides the friction material with many advantageous properties, including good oil retention and unique oil flow across the friction surface.

In one aspect, the base material layer is more porous than the top layer of the friction modifying particles. Thus, according to one aspect of the present invention, the top layer has a lower permeability in the normal direction than the base later. The lower normal fluid permeability of the top layer together with the micro hard solid regular mountain-valley type surface topography cause the oil to remain on the friction surface and create channels of oil flow across the friction surface. An effective surface cooling mechanism and constant surface lubrication is then achieved. This unique feature, i.e., the unique surface structure, makes the material of the present invention very durable in slipping clutch applications. In addition, the symmetric round shape of the friction modifying particles provides a friction material that has much less abrasive wear than the other friction materials that have irregular shapes of particles.

In another aspect, the present invention relates to a friction material comprising a base material saturated with at least one type of curable resin and at least one type of friction modifying particles having a regular geometry. The regular geometry of the friction modifying particles provides improvement surface oil retention and oil flow to the friction materials.

In one aspect of the present invention, the friction modifying materials of the regular geometry comprise a round, flat disks of celite. When applied as a top layer to a base material, the friction modifying particles having a regular geometry such as round, flat disks, provide a unique surface stacking pattern which improves oil retention and oil flow on the friction surface.

In one aspect of the present invention, the base material average voids volume from about 50% to about 85%. In certain embodiments, the base material has an average pore/void/interstice diameter of about 5 $\mu$m.

Further, in certain embodiments, the friction modifying particles comprise silica, celite particles, and in certain other embodiments, diatomaceous earth. In one particular aspect of the present invention, the friction modifying particles comprise celite having a regular shape. The friction modifying materials used in the friction of the present invention can have a preferred geometry, such as a symmetrical geometric shape. The symmetrically geometric shaped friction modifying particles act to hold a quantity of lubricant at the friction surface and to create channels of oil flow across the friction surface due to the micro hard solid regular mountain-valley type surface topography of the stacking layers of symmetrically shaped friction modifying particles. In certain embodiments, celite is useful as a friction modifying material since celite typically has a symmetrical shape. In use, the layer of oil or fluid on the top, geometrically shaped friction modifying particle layer keeps the oil flow film on the surface, thus making it more difficult for the oil or fluid to initially penetrate into the friction material. The top friction modifying material layer holds the fluid lubricant on the surface and increases the oil retaining capacity of the friction material. The friction material of the present invention thus allows an oil film to remain on its surface. This provides good coefficient of friction characteristics and good slip durability characteristics.

By measuring the liquid permeability of how fast the material flows through the friction material, it is seen that the fluid material penetrates the top layer of the present invention more slowly since it is harder to push the fluid through the top layer.

The friction material further comprises a top, or second, layer of the regular geometrical shaped friction modifying particles on a first, or top, surface of the base material. The presence of the friction modifying materials as a top layer on the base material provides the friction material with many advantageous properties, including good oil retention and surface oil flow properties.

In still other embodiments, it is within the contemplates scope of the present invention that the regular geometrical shaped friction modifying particles can further include other friction modifying particles such as metal oxides, nitrides, carbides, and in further embodiments, a mixture of carbon particles and silica particles.

It is also within the contemplated scope of the present invention that these embodiments can include, for example, silica oxides, iron oxides, aluminum oxides, titanium oxides and the like; silica nitrides, iron nitrides, aluminum nitrides, titanium nitrides and the like; and, silica carbides, iron carbides, aluminum carbides, titanium carbides and the like.

Various base materials are useful in the friction material of the present invention, including, for example, non-asbestos base materials comprising, for example, fabric materials, woven and/or nonwoven materials. Suitable base materials include, for example, fibers and fillers. The fibers can be organic fibers, inorganic fibers and carbon fibers. The organic fibers can be aramid fibers, such as fibrillated and/or nonfibrillated aramid fibers, acrylic fibers, polyester fibers, nylon fibers, polyamide fibers, cotton/cellulose fibers and the like. The fillers can be, for example, silica, diatomaceous earth, graphite, alumina, cashew dust and the like.

In other embodiments, the base material can comprise woven materials, non-woven materials, and paper materials. Further, examples of the various types of base materials useful in the present invention are disclosed in the above-referenced BorgWarner U.S. patents which are fully incorporated herein by reference. It should be understood however, that other embodiments of the present invention can include yet different base materials.

In certain embodiments, the friction material comprises a base material which has a plurality of voids or interstices therein. The size of the voids in the base material can range from about 0.5 μm to about 20 μm.

In certain embodiments, the base material preferably has a void volume of about 50 to about 60% such that the base material is considered "dense" as compared to a "porous" woven material. In certain embodiments, the base material can be any suitable material such as a fibrous base material.

The friction material further comprises a resin material which at least partially fills the voids in the base material. The resin material is substantially uniformly dispersed throughout the thickness of the base material.

In certain embodiments, the base material comprises a fibrous base material where less fibrillated fibers and carbon fibers are used in the fibrous base material to provide a desirable pore structure to the friction material. The fiber geometry not only provides increased thermal resistance, but also provides delamination resistance and squeal or noise resistance. Also, in certain embodiments, the presence of the carbon fibers and carbon particles aids in the fibrous base material in increasing the thermal resistance, maintaining a steady coefficient of friction and increasing the squeal resistance. A relatively low amount of cotton fibers in the fibrous base material can be included to improve the friction material's clutch "break-in" characteristics.

The use of less fibrillated aramid fibers and carbon fibers in a fibrous base material improves the friction material's ability to withstand high temperatures. Less fibrillated aramid fibers generally have few fibrils attached to a core fiber. The use of the less fibrillated aramid fibers provides a friction material having a more porous structure; i.e., there are larger pores than if a typical fibrillated aramid fiber is used. The porous structure is generally defined by the pore size and liquid permeability. In certain embodiments, the fibrous base material defines pores ranging in mean average size from about 2.0 to about 25 microns in diameter. In certain embodiments, the mean pore size ranges from about 2.5 to about 8 microns in diameter and the friction material had readily available air voids of at least about 50% and, in certain embodiments, at least about 60% or higher, an in certain embodiments up to and including about 85%.

Also, in certain embodiments, it is desired that the aramid fibers have a length ranging from about 0.5 to about 10 mm and a Canadian Standard Freeness (CSF) of greater than about 300. In certain embodiments, it is also desired to use less fibrillated aramid fibers which have a CSF of about 450 to about 550 preferably about 530 and greater; and, in other certain embodiments, about 580–650 and above and preferably about 650 and above. In contrast, more fibrillated fibers, such as aramid pulp, have a freeness of about 285–290.

The "Canadian Standard Freeness" (T227 om-85) means that the degree of fibrillation of fibers can be described as the measurement of freeness of the fibers. The CSF test is an empirical procedure which gives an arbitrary measure of the rate at which a suspension of three grams of fibers in one liter of water may be drained. Therefore, the less fibrillated aramid fibers have higher freeness or higher rate of drainage of fluid from the friction material than more fibrillated aramid fibers. Friction materials comprising the aramid fibers having a CSF ranging from about 430–650 (and in certain embodiments preferably about 580–640, or preferably about 620–640), provide superior friction performance and have better material properties than friction materials containing conventionally more fibrillated aramid fibers. The longer fiber length, together with the high Canadian freeness, provides a friction material with high strength, high porosity and good wear resistance. The less fibrillated aramid fibers (CSF about 530–about 650) have especially good long-term durability and stable coefficients of friction.

Various fillers are also useful in the primary layer of the fibrous base material of the present invention. In particular, silica fillers, such as diatomaceous earth, are useful. However, it is contemplated that other types of fillers are suitable for use in the present invention and that the choice of filler depends on the particular requirements of the friction material.

In certain embodiments, cotton fiber is added to the fibrous base material of the present invention to give the fibrous material higher coefficients of friction. In certain embodiments, about 5 to about 20%, and, in certain embodiments, about 10% cotton can also be added to the fibrous base material.

One example of a formulation for the primary layer of a fibrous base material as described in the above incorporated by reference U.S. Pat. No. 6,130,176, which comprises about 10 to about 50%, by weight, of a less fibrillated aramid fiber; about 10 to about 35%, by weight, of activated carbon particles; about 5 to about 20%, by weight, cotton fibers; about 2 to about 15%, by weight, carbon fibers; and, about 10 to about 35%, by weight of a filler material.

In certain other embodiments, one particular formulation has found to be useful comprises about 35 to about 45%, by weight, less fibrillated aramid fibers; about 10 to about 20%, by weight, activated carbon particles; about 5 to about 15% cotton fibers; about 2 to about 20%, by weight, carbon fibers; and, about 25 to about 35%, by weight, filler.

In certain embodiments, the base material comprises from about 15 to about 25% cotton, about 50% aramid fibers, about 20% carbon fibers, about 15% carbon particles, about 15% celite, and, optionally, about 3% latex addon.

In other embodiments, the base material comprises from about 15 to about 25% cotton, about 40 to about 50% aramid fibers, about 10 to about 20% carbon fibers, about 5 to about 15% carbon particles, about 5 to about 15% celite, and, optionally, about 3% latex addon.

When the base material has a higher mean pore diameter and fluid permeability, the friction material is more likely to run cooler or with less heat generated in a transmission due to better automatic transmission fluid flow throughout the porous structure of the friction material. During operation of a transmission system, the fluid tends, over time, to breakdown and form "oil deposits", especially at high temperatures. These "oil deposits" decrease the pore openings. Therefore, when the friction material initially starts with larger pores, there are more open pores remaining during the useful life of the friction material.

The use of friction modifying particles as a top on the primary layer of the base material provides a desired three-dimensional structure to the base material.

The friction material of the present invention allow an oil film to remain on its surface due to the unique three-dimensional structure of the top friction modifying particle layer. This also provides good stability of friction characteristics and good slip durability. The friction modifying particles on the top surface of the base material provides an improved three-dimensional structure to the resulting friction material.

In certain embodiments, the average area of coverage of friction modifying particles forming the top layer is in the range of about 80 to about 100% of the surface area. In certain other embodiments, the average area of coverage ranges from about 90 to about 100%. The friction modifying particles substantially remain on the top surface of the base material at a preferred average thickness of about 35 to about 200 microns. In certain embodiments, the top layer has a preferred average thickness of about 60 to about 100 microns; and in certain embodiments, about 75 to about 85 microns.

The uniformity of the deposited layer of the friction modifying particles on the surface of the base material is achieved by using a size of the particles that can range from about 0.15 to about 80 microns in diameter, and in certain embodiments from about 0.5 to about 20 microns. In certain embodiments, the particles have an average particle diameter of about 12 microns. In certain embodiments, it has been discovered that if the friction modifying particle size is too large or too small, a desired optimum three-dimensional structure not achieved and, consequently, the heat dissipation and antishudder characteristics are not as optimum.

The amount of coverage of friction modifying particles on the base material is sufficiently thick such that the layer of friction modifying particles has a three dimensional structure comprised of individual particles of the friction modifying material and voids or interstices between the individual particles. In certain embodiments, the top layer (of friction modifying particles) is less porous than the lower layer (of the base material.

Various types of friction modifying particles are useful in the friction material. In one embodiment, useful friction modifying particles include silica particles. Other embodiments can have friction modifying particles such as resin powders such as phenolic resins, silicone resins epoxy resins and mixtures thereof. Still other embodiments can include partial and/or fully carbonized carbon powders and/or particles and mixtures thereof; and mixtures of such friction modifying particles. In certain embodiments, silica particles such as diatomaceous earth, Celite®, Celatom®, and/or silicon dioxide are especially useful. The silica particles are inexpensive inorganic materials which bond strongly to the base material. The silica particles provide high coefficients of friction to the friction material. The silica particles also provide the base material with a smooth friction surface and provide a good "shift feel" and friction characteristics to the friction material such that any "shudder" is minimized.

In certain embodiments, the friction modifying materials comprising the top layer of the friction material in the friction of the present invention can have an irregular shape. The irregular shaped friction modifying particles act to hold a desired quantity of lubricant at the surface of the base material due to the capillary action of many invaginations on the surface of the irregularly shaped friction modifying particle. In certain embodiments, a silica material such as celite is useful as a friction modifying material since celite has an irregular or rough surface.

The friction material can be impregnated using different resin systems. In certain embodiments, it is useful to use at least one phenolic resin, at least one modified phenolic-based resin, at least one silicone resin, at lest one modified silicone resin, at least one epoxy resin, at least one modified epoxy resin, and/or combinations of the above. In certain other embodiments, a silicone resin blended or mixed with a phenolic resin in compatible solvents is useful.

Various resins are useful in the present invention. In certain embodiments, the resin can comprise phenolic or phenolic based resins, preferably so that the saturant material comprises about 45 to about 65 parts, by weight, per 100 parts, by weight, of the friction material. After the resin mixture has been applied to the base material and the base material has been impregnated with the resin mixture, the impregnated base material is heated to a desired temperature for a predetermined length of time to form a friction material. In certain embodiments, the heating cures the phenolic resin present in the saturant at a temperature of about 300° F. When other resins are present in the saturant, such as a silicone resin, the heating cures the silicone resin at a temperature of about 400° F. Thereafter, the cured friction material is adhered to a desired substrate by suitable means.

Various useful resins include phenolic resins and phenolic-based resins. It is to be understood that various phenolic-based resins which include in the resin blend other modifying ingredients, such as epoxy, butadiene, silicone, tung oil, benzene, cashew nut oil and the like, are contemplated as being useful with the present invention. In the phenolic-modified resins, the phenolic resin is generally present at about 50% or greater by weight (excluding any solvents present) of the resin blend. However, it has been found that friction materials, in certain embodiments, can be improved when the mixture includes resin blend containing about 5 to about 80%, by weight, and for certain purposes, about 15 to about 55%, and in certain embodiments about 15 to about 25%, by weight, of silicone resin based on the weight of the silicone-phenolic mixture (excluding solvents and other processing acids).

Examples of useful phenolic and phenolic-silicone resins useful in the present invention are fully disclosed in the above-referenced BorgWarner U.S. patents which are fully incorporated herein, by reference. Silicone resins useful in the present invention include, for example, thermal curing silicone sealants and silicone rubbers. Various silicone resins are useful with the present invention. One resin, in particular, comprises xylene and acetylacetone (2,4-pentanedione). The silicone resin has a boiling point of about 362° F. (183° C.), vapor pressure at 68° F. mm, Hg: 21, vapor density (air=1) of 4.8, negligible solubility in water, specific gravity of about 1.09, percent volatile, by weight, 5% evaporation rate (ether=1), less than 0.1, flash point about 149° F. (65° C.) using the Pensky-Martens method. It is to be understood that other silicone resins can be utilized with the present invention. Other useful resin blends include, for example, a suitable phenolic resin comprises (% by wt.): about 55 to about 60% phenolic resin; about 20 to about 25% ethyl alcohol; about 10 to about 14% phenol; about 3 to about 4% methyl alcohol; about 0.3 to about 0.8% formaldehyde; and, about 10 to about 20% water. Another suitable phenolic-based resin comprises (% by wt.): about 50 to about 55% phenol/formaldehyde resin; about 0.5% formaldehyde; about 11% phenol; about 30 to about 35% isopropanol; and, about 1 to about 5% water.

It has also been found that another useful resin is an epoxy modified phenolic resin which contains about 5 to about 25 percent, by weight, and preferably about 10 to about 15 percent, by weight, of an epoxy compound with the remainder (excluding solvents and other processing aids) phenolic resin. The epoxy-phenolic resin compound provides, in certain embodiments, higher heat resistance to the friction material than the phenolic resin alone.

In certain embodiments, it is preferred that resin mixture comprises desired amounts of the resin and the friction modifying particles such that the target pick up of resin by the base material ranges from about 25 to about 70%, in other embodiments, from about 40 to about 65%, and, in certain embodiments, about 60 to at least 65%, by weight, total silicone-phenolic resin. After the base material is saturated with the resin, the base material is cured for a period of time (in certain embodiments for about ½ hour) at temperatures ranging between 300–400° C. to cure the resin binder and form the friction material. The final thickness of the friction material depends on the initial thickness of the base material.

It further contemplated that other ingredients and processing aids known to be useful in both preparing resin blends and in preparing base materials can be included, and are within the contemplated scope of the present invention.

In certain embodiments, the resin mixture can comprise both the silicone resin and the phenolic resin which are present in solvents which are compatible to each other. These resins are mixed together (in preferred embodiments) to form a homogeneous blend and then used to saturate the base material. In certain embodiments, there is not the same effect if the base material is impregnated with a phenolic resin and then a silicone resin is added thereafter or vice versa. There is also a difference between a mixture of a silicone-phenolic resin solution, and emulsions of silicone resin powder and/or phenolic resin powder. When silicone resins and phenolic resins are in solution they are not cured at all. In contrast, the powder particles of silicone resins and phenolic resins are partially cured. The partial cure of the silicone resins and the phenolic resins inhibits a good saturation of the base material.

In certain embodiments of the present invention, the base material is impregnated with a blend of a silicone resin in a solvent which is compatible with the phenolic resin and its solvent. In one embodiment, isopropanol has been found to be an especially suitable solvent. It is to be understood, however, that various other suitable solvents, such as ethanol, methyl-ethyl ketone, butanol, isopropanol, toluene and the like, can be utilized in the practice of this invention. The presence of a silicone resin, when blended with a phenolic resin and used to saturate the base material, causes the resulting friction materials to be more elastic than base materials impregnated only with a phenolic resin. When pressures are applied to the silicone-phenolic resin blended impregnated friction material of the present invention, there is a more even distribution of pressure, which, in turn, reduces the likelihood of uneven lining wear. After the silicone resin and phenolic resin are mixed together with the friction modifying particles, the mixture is used to impregnate the base material.

The friction material of the present invention includes a layer of friction modifying particles on a top surface of a base material provides a friction material with good anti-shudder characteristics, high resistance, high coefficient of friction, high durability, good wear resistance and improved break-in characteristics.

Figure 1:
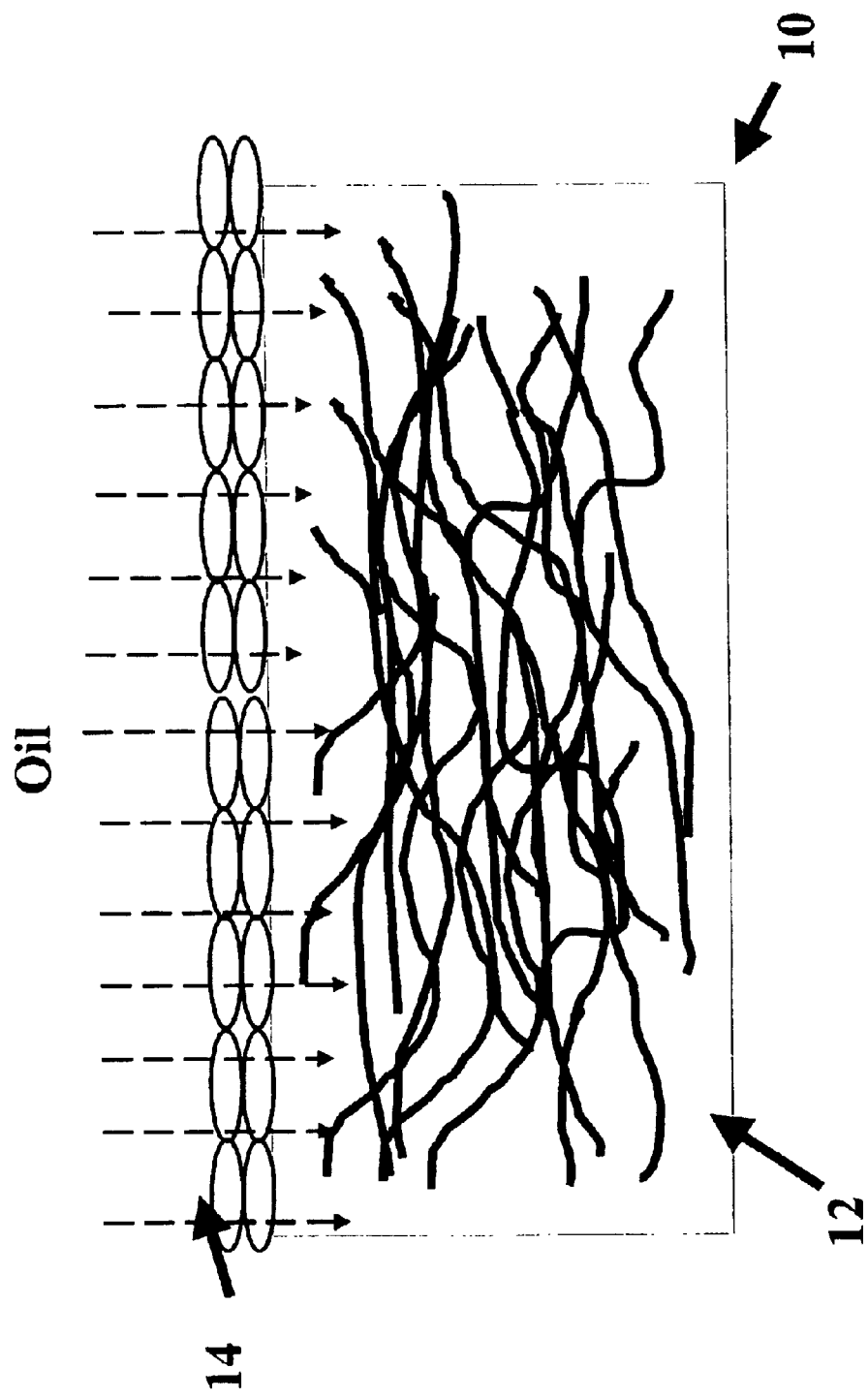
FIG. 1 is a schematic diagram of a friction material having a top layer of regular geometrical friction modifying materials.

FIG. 1 shows a schematic diagram of a friction material 10 having a base material 12 and a layer of regular geometrical shaped surface friction modifying materials 14 substantially covering the base material 12.

Figure 2:
FIG. 2 is an SEM image showing the round disks of the regular shaped celite friction modifying particles on a base material.

The layer of friction modifying materials used in the friction material of the present invention provides the friction material with good anti-shudder characteristics. In the embodiment shown, the high temperature synthetic fibers and porosity of the base material provides improved heat resistance. Example 1, shown in FIG. 2, is a friction material of the present invention which shows a layer of the friction modifying particles on a top surface of the base material. The round disk celite layer provides improved oil retention and surface oil flow.

The following examples provide further evidence that the gradient of friction modifying particles within the friction material of the present invention provides an improvement over conventional friction materials. The friction materials have desirable coefficient of friction, heat resistance and durability characteristics. Various preferred embodiments of the invention are described in the following examples, which however, are not intended to limit the scope of the invention.

EXAMPLES

Example I

A slip durability test was conducted. FIG. 3 shows the slope versus slipping time for Ex. 1; Compar A. which contains about 20 to about 40% celite and about 1 to 10%, based on the basis weight of the paper, of celite as a top, or secondary layer; and Compar. C which comprises a single layer material of about 40 to about 60% celite and 40 to about 60% organic fibers. In contrast, the Ex. 1 of the present invention has a more effective deposit of the friction modifying particles on the surface of the base material. Only a negligible amount of the friction modifying particles on the top surface of the Ex. 1 friction material penetrate in the base, or primary, layer. The symmetrical shaped friction modifying particles stack or pile up on the base material to form a good layer of a "mountain and valley" type of three-dimensional structure. This three-dimensional structure creates positive friction behavior for the friction material of the present invention, including good oil flow or lubrication, good positive $\mu$-v slopes, and good durability. While not wishing to be bound by theory, it is believed that the new material has a better three-dimensional structure and better characteristics since the symmetrical shaped friction modifying particles stay on the friction surface, the supporting fibers and filler remain in the base material.

FIG. 3 shows slope versus slipping time graphs for Compar. C, Compar. A and Ex. 1. The slope versus slipping time for the grooved material shows that the Ex. 1 has a longer life. The slope (p-speed) of $-1 \times 10^{-5}$ is acceptable in the industry. Any product having a slope below level that does not have the desired coefficient of friction characteristics. The Ex. 1 material allows the oil flow to be within the desired conditions and allows for good dissipation of heat.

Example II

FIGS. 4a and 4b show the results of an "E" clutch bench test were conducted for Compar. A and Ex. 1 for low oil flow. Both examples have improved anti-shudder characteristics and that both are improved materials with non-squawk.

FIGS. 4a and 4b show ascending or rooster tailed torque curve for the Compar. C versus a descending torque curves for the Ex. 1. The Compar. C curves have negative $\mu$-v slope in the whole speed range while the Ex. 1 curves have positive $\mu$-v slopes in the whole speed range. The positive $\mu$-v slopes are preferred and necessary for a smooth clutch operation (engagement or slipping).

The condition shown in FIG. 4 is very special for a shifting clutch. This clutch connects to a long shaft and operates in a low lubrication situation. The operating condition is severe (high energy, low lubrication engagement) and is sensitive to vibration (due to the long shaft connection). Any ascending torque curve for this clutch results in noise (squawk) and vibration, such as shown in FIG. 4a. The vehicle, or Dyno, test can easily reveal the torque vibration for this condition. The Ex. 1 of the present invention shows how these obstacles are overcome, as shown by FIG. 4b.

Example III and Example IV

The FIGS. 5a–5b show the thickness of the deposit layer as being about 80 $\mu$m. The distinct layer of the deposit particles is also shown. For 80 $\mu$m per layer cut, the front and back view of the top layer show yellow/brown color, that is exactly the deposit layer color. The front view of the second layer in this FIGS. (5a–5b) reveals the green color of the base material. By combining the top and second layer images in the front and back view, it is clearly shown that the deposit layer thickness is about 80 $\mu$m (the thickness of the cut).

In FIGS. 6a–6b, the top layer shows yellow/brown color (which is always the case since this is the friction surface composed of Celite particles and resin), while the back view shows green color (this is the color of the base material). The different color on front view and back view shows that the 1001 $\mu$m (per layer cut) is more than the thickness of the deposit layer.

These two sets of FIGS. (5a–b and 6a–b) demonstrate the deposit layer thickness to be about 80 $\mu$m. The revealed color contrast between deposit layer and base material is more evidence of the existence of deposit layer.

Example V

The deposit of the friction modifying particle creates a dense surface layer which reduces permeability of the top layer. In certain embodiments, the friction material of the present invention has a permeability that is lower in the normal direction (i.e., direction perpendicular to the plane defined by the top layer), than the normal permeability of the first or base material layer.

The lower normal fluid permeability of the top layer together with the micro hard solid regular mountain-valley type surface topography cause the oil to remain on the friction surface and create channels of oil flow across the friction surface. An effective surface cooling mechanism and constant surface lubrication is then achieved. This unique feature from the unique surface structure makes the friction material of the present invention very durable in slipping clutch applications. In addition, the symmetric round shape of the modifying particles provides a much less abrasive wear than the other irregular shapes of particles.

INDUSTRIAL APPLICABILITY

The present invention is useful as a high energy friction material for use with clutch plates, transmission bands, brake shoes, synchronizer rings, friction discs, or system plates.

The above descriptions of the preferred and alternative embodiments of the present invention are intended to be illustrative and are not intended to be limiting upon the scope and content of the following claims.

We claim:

1. A friction material comprising a first layer comprising a base material and at least one type of resin material, and a second layer comprising at least one type of friction modifying particle on a top surface of the base material, the friction modifying particles having at least one type of substantially symmetrical geometric shape, the second layer forming a stacking three-dimensional structure the second layer having an average thickness of about 30 to about 200 microns, wherein the second layer has a fluid permeability lower than the first layer.

2. The friction material of claim 1, wherein the layer of the friction modifying particles has a thickness of about 60 to about 100 microns.

3. The friction material of claim 1, wherein the second layer has a lower permeability in the radial direction and a lower permeability in the normal direction that the first layer.

4. The friction material of claim 1, wherein the friction modifying particles have an average diameter size from about 0.1 to about 80 microns.

5. The friction material of claim 1, wherein the friction modifying particles have an average diameter size from about 0.5 to about 20 microns.

6. The friction material of claim 1, wherein the base material has an average voids volume from about 50 to about 85%.

7. The friction material of claim 1, wherein the friction modifying particles comprise silica particles.

8. The friction material of claim 7, wherein the friction modifying particles comprise celite particles.

9. The friction material of claim 8, wherein the particles of celite have a size ranging from about 2 to about 20 microns.

10. The friction material of claim 7, wherein the friction modifying particles comprise diatomaceous earth.

11. The friction material of claim 7, wherein the celite has a generally flat or disc shape.

12. The friction material of claim 1, wherein the friction modifying particles comprise a mixture of carbon particles and silica particles.

13. The friction material of claim 1, wherein the friction modifying particles comprise metal oxides.

14. The friction material of claim 1, wherein the friction modifying particles comprise nitrides.

15. The friction material of claim 1, wherein the friction modifying particles comprise carbides.

16. The friction material of claim 1, wherein the base material comprises a fibrous base material.

17. The friction material of claim 1, wherein the base material is a nonwoven fibrous material.

18. The friction material of claim 17, wherein the fibrous base material has an average pore diameter of about 5 to about 10 microns.

19. The friction material of claim 1, wherein the base material is a woven fibrous material.

20. The friction material of claim 1, wherein the base material comprises from about 15 to about 25% cotton, about 40 to about 50% aramid fiber, about 10 to about 20% carbon fibers, about 5 to about 15% carbon particles, and, about 5 to about 15% celite.

21. The friction material of claim 20, wherein the second layer of the friction material comprises silica friction modifying particles deposited on fibers and fillers in the fibrous base material.

22. The friction material of claim 1, wherein the base material comprises about 10 to about 50%, by weight, of a less fibrillated aramid fiber; about 10 to about 35%, by weight, of activated carbon particles; about 5 to about 20%, by weight, cotton fibers, about 2 to about 15%, by weight, carbon fibers; and, about 10 to about 35%, by weight of a filler material.

23. The friction material of claim 1, wherein the resin comprises at least one phenolic resin, at least one modified phenolic resin, at least one silicon resin, at least one silicone modified resin, at least one epoxy resin, at least one epoxy modified resin, and mixtures of the above.

24. The friction material of claim 23, wherein the phenolic resin is present in a solvent material and the silicone resin is present in a solvent material which is compatible with the solvent material of the phenolic resin.

25. The friction material of claim 23, wherein the amount of silicone resin present in the silicone-phenolic resin mixture ranges from about 20 to about 25%, by weight, based on the weight of the mixture.

26. The friction material of claim 23, wherein the amount of silicone resin present in the silicone phenolic resin mixture ranges from about 15 to about 25%, by weight, based on the weight of the mixture.

27. The friction material of claim 23, wherein the modified phenolic resin comprises at least one epoxy phenolic resin.

28. The friction material of claim 23, wherein the amount of epoxy resin present in the epoxy phenolic resin ranges from about 5 to about 25%, by weight, based on the weight of the epoxy phenolic resin.

29. The friction material of claim 23, wherein the amount of epoxy resin present in the epoxy phenolic resin ranges from about 10 to about 15%, by weight, based on the weight of the epoxy phenolic resin.

30. The friction material of claim 1, wherein the resin comprises a mixture of at least one phenolic resin and at least one silicone resin wherein the amount of silicone resin in the resin mixture ranges from approximately 5 to approximately 80%, by weight, based on the weight of the resin mixture.

* * * * *